UNITED STATES PATENT OFFICE 2,844,578
PYRIMIDINE DERIVATIVES

Donald S. Acker, Brookside Park, Del., assignor to E. I. du Pont de Nemours and Company, Wilmington, Del., a corporation of Delaware No Drawing. Application September 14, 1955
Serial No. 534,397

4 Claims. (Cl. 260—256.5)

This invention relates to pyrimidines and more particularly to new pyrimidines having an amino group in the 4-position which is bonded through a carbon chain to annular carbon of a heterocyclic ring.

Pyrimidines have received considerable interest since many compounds containing this ring system have physiological importance. The pyrimidine ring is present in certain vitamins and coenzymes. It is a necessary constituent of the nucleic acids. In many cases it is present as a portion of a large, complicated structure, e. g., in the purines, pteridines and the alloxazines. Such compounds are generally more difficult to prepare than simple pyrimidines.

This invention has as an object the preparation of new pyrimidines. A further object is the preparation of new plant regulatory substances. Another object is the preparation of pyrimidines of ready preparation through available intermediates. Other objects will appear hereinafter.

These objects are accomplished by the present invention of pyrimidines which have an amino nitrogen directly attached to carbon in the 4-position of a monocyclic pyrimidine nucleus to which amino nitrogen is further attached through a lower aliphatic hydrocarbon chain to annular carbon of a heterocyclic ring which heterocyclic ring contains five atoms of which not more than two are hetero atoms. In a more preferred embodiment, the compounds of this invention have the general formula

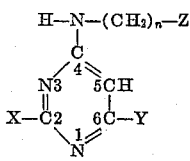

wherein X is thiol or chlorine, Y is hydrogen or methyl, and Z is a heterocyclic five-membered ring containing, in addition to carbon, but one oxygen or sulfur, i. e., a chalcogen of atomic weight less than 33, with the heterocyclic ring being bonded to the aliphatic chain from annular carbon, and $n$ is an integer of from one to not over four.

The compounds of this invention can be obtained by the reaction of a pyrimidine which has a sulfhydryl or chlorine in the 4-position with an amino hydrogen bearing monoamine having the above defined heterocyclic radical attached, through a lower aliphatic hydrocarbon chain, to the amino nitrogen.

The following examples in which the parts are by weight further illustrate the preparation and properties of the compounds of this invention.

EXAMPLE I 4-furfurylamino-2-pyrimidinethiol

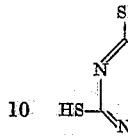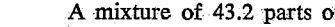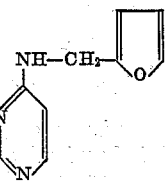

A mixture of 43.2 parts of dithiouracil and 100 parts of furfurylamine is heated at 100° C. for six hours with the evolution of hydrogen sulfide. The reaction mixture is broken up and stirred with alcohol to dissolve the excess furfurylamine. The solid material is collected, dissolved in dilute alkali, decolorized with carbon and made acid with acetic acid to give 34 parts of 4-furfurylamino-2-pyrimidinethiol, M. P. 242–244° C. An analytical sample was prepared by recrystallization from ethanol.

Analysis. — Calculated for $C_9H_9N_3OS$: C, 52.2%; H, 4.4%; N, 20.3%. Found: C, 52.15%; H, 4.18%; N, 19.88%.

EXAMPLE II 4-furfurylamino-2-chloropyrimidine

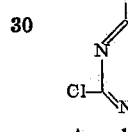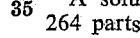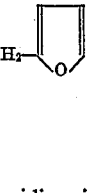

A solution of 30 parts of 2,4-dichloropyrimidine in 264 parts of methanol is stirred at 30–40° C. while 50 parts of furfurylamine is added. The reaction mixture is allowed to stand at room temperature overnight. The solvent is then removed at reduced pressure by distillation from a 40° C. water bath. The residue is stirred with 100 parts of water, and the solid is collected and dried. Recrystallization from a benzene-heptane solvent pair gives 30.5 parts of 4-furfurylamino-2-chloropyrimidine, M. P. 116–117.5° C., and 4.9 parts of 2-furfurylamino-4-chloropyrimidine, M. P. 79–80° C.

Analysis.—Calculated for $C_9H_8ClN_3O$: C, 51.55%; H, 3.85%; Cl, 16.9%; N, 20.0%. Found (4-furfurylamino-2-chloropyrimidine): C, 52.39%, 52.11%; H, 3.85%, 4.12%; Cl, 17.73%; N, 19.43%, 19.78%; (2-furfurylamino-4-chloropyrimidine): C, 51.67%, 51.77%; H, 3.92%, 3.93%; N, 20.36%, 20.25%.

EXAMPLE III 4-tetrahydrofurfurylamino-2-pyrimidinethiol

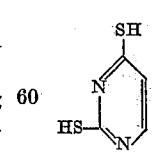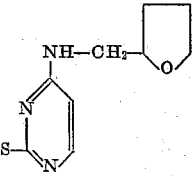

A mixture of 14.4 parts of 2,4-dithiouracil and 50 parts of tetrahydrofurfurylamine is heated on the steam bath for six hours. The excess amine is recovered by distillation at reduced pressure, and the residue is recrystallized from alcohol to give 14.0 parts of 4-tetrahydrofurfurylamino-2-pyrimidinethiol, M. P. 225–230° C. An analytical sample, M. P. 230–231° C., was obtained by recrystallization from ethanol.

*Analysis.*—Calculated for $C_9H_{13}N_3OS$: C, 51.2%; H, 6.2%. Found: C, 50.95%; H, 6.14%.

EXAMPLE IV

4-thenylamino-2-pyrimidinethiol

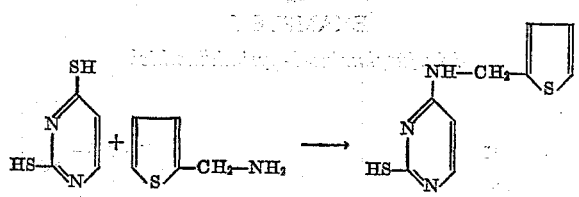

A mixture of 14.4 parts of dithiouracil and 50 parts of 2-thenylamine is heated on the steam bath for six hours, or until the evolution of hydrogen sulfide stops. The reaction mixture is chilled and diluted with diethyl ether to remove the excess base. The solid is collected and washed with ethanol and with ether to give 16.1 parts of 4-thenylamino-2-pyrimidinethiol, M. P. 224–228° C. dec. An analytical sample, M. P. 229–231° C., was prepared by recrystallization from ethanol.

*Analysis.*—Calculated for $C_9H_9N_3S_2$: C, 48.5%; H, 4.05%. Found: C, 48.85%; H, 4.25%.

EXAMPLE V

6-methyl-4-furfurylamino-2-pyrimidinethiol

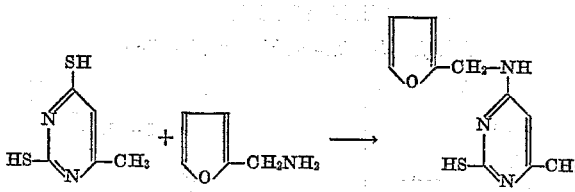

6-methyl-2,4-dithiolpyrimidine (10.5 parts) and 30 parts of furfurylamine are heated at 140° C. for two hours. The dark reaction mixture is diluted with ether and filtered, and the solid is washed with concentrated ammonium hydroxide to remove any unreacted starting material. The solid is crystallized from dimethylformamide to give 8.66 parts of crude product, M. P. >220° C. dec. One further crystallization from dimethylformamide gave the product as a colorless solid, M. P. 220° C. dec.

*Analysis.*—Calculated for $C_{10}H_{11}ON_3S$: C, 54.28%; H, 5.01%; N, 18.99%. Found: C, 53.93%; H, 4.98%; N, 18.11%.

EXAMPLE VI

6-methyl-4-(3'-methyl-2'-thenylamino)-pyrimidinethiol

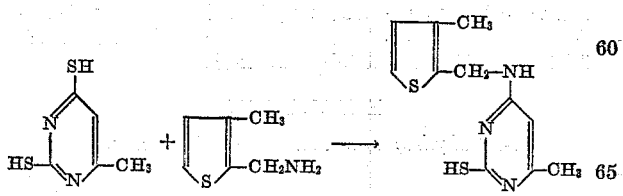

6-methyl-2,4-dithiolpyrimidine (9.7 parts) is heated at 150° C. for one hour with 15.6 parts of 3-methyl-2-thenylamine. The product is taken up in ether, filtered, washed with concentrated ammonium hydroxide, and crystallized twice from dimethylformamide to give 5.13 parts of pale yellow product, M. P. >240° C. dec. Two further crystallizations from a mixture of ethyl acetate and dimethylformamide gave the product as a pale yellow solid, M. P. >240° C. dec.

*Analysis.*—Calculated for $C_{11}H_{13}N_3S_2$: C, 52.56%; H, 5.21%; N, 16.72%. Found: C, 52.37%; H, 5.37%; N, 16.79%, 16.82%.

EXAMPLE VII

6-methyl-4-(5'-methyl-2'-thenylamino)-2-pyrimidinethiol

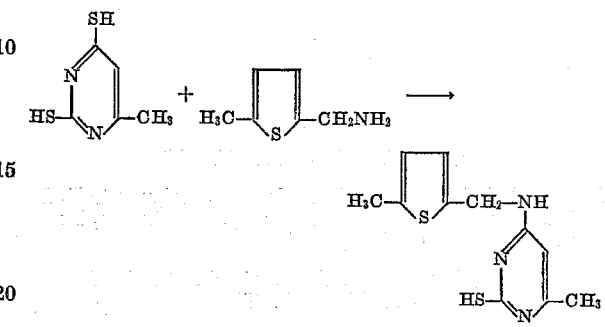

A mixture of 6-methyl-2,4-dithiolpyrimidine (10.5 parts) and 30.7 parts of 5-methyl-2-thenylamine is treated as described above (Example VI) to give 10.2 parts of light yellow product, M. P. >245° C. dec. Two crystallizations from a mixture of ethyl acetate and dimethylformamide gave the product as a colorless solid, M. P. 240° C. dec.

*Analysis.*—Calculated for $C_{11}H_{13}N_3S_2$: C, 52.56%; H, 5.21%; N, 16.72%. Found: C, 52.87%; H, 5.24; N, 16.84%, 17.00%.

The present invention is generic to new pyrimidines having a monocyclic pyrimidine nucleus and a second heterocyclic ring joined, through a lower (1–4 carbon) aliphatic hydrocarbon chain from carbon of said heterocyclic ring to amino nitrogen on the 4-position of the pyrimidine ring. The remaining positions of the pyrimidine ring may be unsubstituted or contain groups compatible with the necessary amino substituent, e. g., a methyl or amino substituent on the 6-position of the pyrimidine ring, or a hydroxyl, mercapto, amino, halogeno (especially bromo, chloro, or fluoro), or methyl substituent on the 2-position of the pyrimidine ring. Preferably, the 5-position is unsubstituted (i. e., has hydrogen) and the 2-position contains a mercapto or halo, especially chloro, substituent, while the 6-position is unsubstituted or carries a methyl substituent. The remaining positions of the second heterocyclic ring, bonded from nuclear carbon thereof through aliphatic carbon to the requisite amino substituent in the 4-position of the pyrimidine ring, are preferably attached to hydrogen or lower alkyl. The pyrimidine ring in the compounds of this invention is not fused to another ring, i. e., is nuclearly monocyclic.

The compounds of this invention can be obtained by reaction of a monocyclic pyrimidine having a halogen, preferably chlorine, or thiol group in the 4-position with an amine containing hydrogen on amino nitrogen and attached to the nitrogen through an aliphatic carbon chain to annular carbon of a heterocyclic ring. Except for any hetero atoms in the heterocyclic ring and the amino nitrogen, the amine preferably contains only carbon and hydrogen. The heterocyclic radical is at least of at least 5 ring atoms and preferably has only one hetero atom which is of atomic number of 8 to 16 in group VI (i. e., oxygen or sulfur). The preferred amines have the formula

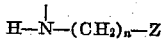

wherein Z is the monovalent heterocyclic radical and $n$ is an integer of at least one, and preferably not over four as in methylene and tetramethylene diradicals, with the remaining valence of the amino nitrogen satisfied by hydrogen or lower alkyl.

As shown in the examples, the amine reacts with a pyrimidine containing a thiol or halogen in the 4-position at temperatures of the order of 35–160° C. In general, the higher temperatures (e. g., 75–150° C.) are employed when the thiol is used. Although inert solvents or diluents can be present, they are not necessary. Excess amine can be used as the reactant and solvent.

The new pyrimidines of this invention are generally solids which can be crystallized from such solvents as alcohol, ethyl acetate or dimethylformamide. The compounds have physiological activity. For example, in concentrations of from 0.01 to 1000 parts per million they affect the germination of seeds, such as sunflower seeds, and the growth of miniature plants, such as duckweed, and of plant tissue, particularly carrot tissue.

The seed germination tests were carried out by placing the seeds on pads of filter paper moistened with 0.1–0.2% solution of the pyrimidine in water. The seeds were maintained at 25° C. in the dark and germination observed daily. Optionally, the seeds can be first sterilized by dipping in 70% ethanol followed by soaking in 1% calcium hypochlorite solution for 5–30 minutes. In both instances the pyrimidines of the present invention exhibited profound effects on seeds. Thus, sunflower seeds treated with a 0.2% aqueous solution of the pyrimidine of Example I showed more rapid germination and increased elongation of hypocotyl in contrast to untreated control seeds.

Plant growth was observed by culturing sterile duckweed plants under aseptic conditions at 25° C. under continuous illumination in a solution of mineral salts supplemented with sucrose and vitamins. The new pyrimidines of this invention exhibit marked stimulative effects on the growth of the test plants. Thus, the compound of Example I, when added to the test solution at a concentration of 0.1–1.0 µg./ml. (0.1–1.0 p. p. m.) under the above conditions over a period of eleven days, exhibited a stimulative effect on the growth of Spirodela (species of duckweed) as evidenced by the total number of plants versus untreated controls. Furthermore, the compound of Example I, when added to the above nutrient test solution at a concentration of 0.1 µg./ml., and the compound of Example V, when used at a concentration of less than 0.1 µg./ml., both exhibited excellent stimulative effects under the above conditions on the growth of Lemna (species of duckweed) versus untreated control plants as judged by the total number of plants present under the above conditions after a period of 13 days.

The new pyrimidines of this invention also show good plant growth stimulative effects in another type of plant growth test. Thus, fragments of callus root tissue of carrot were blotted dry on sterile filter paper, weighed, and placed in vials containing an aqueous agar-sucrose-vitamins-mineral salts medium, the composition of which is shown below containing 2 µg./ml. of indoleacetic acid, a known plant growth stimulant. After 10 days' incubation at 25° C. the fragments were blotted dry and weighed. A "growth value" was obtained by dividing the final wet weight by the initial wet weight. The average "growth value" obtained in the above control medium was 1.58. Exactly identical experiments were carried out, using the above control medium containing 0.1 µg./ml. of the pyrimidine of Example I. The average "growth value" obtained was then 1.75. The "growth values" were obtained from a statistical treatment of the data from eight replicates.

Basal medium: Per liter
Sucrose _____ g__ 20
$Fe_2(SO_4)_3$ _____ mg__ 25
White's inorganic salts_____ ml__ 100
Vitamins _____ ml__ 1
Hoagland's A–Z solution_____ ml__ 1
Agar _____ g__ 8

The "White's inorganic salts" solution was prepared by dissolving inorganic salts in the amounts listed below:

| | G. |
|---|---|
| $Ca(NO_3)_2$ | 1.44 |
| KCl | 0.65 |
| $KNO_3$ | 0.8 |
| $KH_2PO_4$ | 0.38 |
| $MnSO_4$ | 0.065 |
| $ZnSO_4$ | 0.027 |
| $H_3BO_3$ | 0.016 |
| KI | 0.0075 | in 800 ml. distilled water and mixing this solution, slowly and with stirring, with a solution of 0.72 g. $MgSO_4$ in 200 ml. distilled water.

The "vitamins" of the "basal medium" were as follows:

| Vitamins: | Mg. per liter |
|---|---|
| Niacin | 5 |
| Calcium pantothenate | 5 |
| Pyridoxine.HCl | 5 |
| Thiamin.HCl | 5 |
| Biotin | 100 |

The "Hoagland's A–Z solution" contained inorganic salts in the quantities listed below:

| Salt: | Mg. per liter |
|---|---|
| LiCl | 28 |
| $CuSO_4.5H_2O$ | 55 |
| $ZnSO_4$ | 55 |
| $H_3BO_3$ | 55 |
| $Al_2(SO_4)_3$ | 55 |
| $SnCl_2.H_2O$ | 28 |
| $MnCl_2.4H_2O$ | 40 |
| $NiSO_4.6H_2O$ | 55 |
| $Co(NO_3)_6.6H_2O$ | 55 |
| $TiO_2$ | 55 |
| KI | 28 |
| $(NH_4)_6Mo_7O_{24}.4H_2O$ | 20 |
| $FeCl_3$ | 200 |

Additional specific new pryrimidines of the present invention which exhibit comparable physiological activity and, in concentrations of from 0.01 to 1000 parts per million, effect germination of seeds such as sunflower seeds, the growth of minute plants such as duckweed and the growth of plant tissue, particularly carrot tissue, include 6 - amino - 4 - [N - methyl - 4(2' - furyl)butyl]amino - 2-pyrimidinethiol; 2-amino-4(2'-pyrrolylmethylamino)pyrimidine; 2-hydroxy-4[3-(2'-thienyl)-2-butylamino]pyrimidine; 2,6-dimethyl-4(2'-tetrahydrofurfuryl)aminopyrimidine; 4-(4'-thiazolyl)methylamino-2-pyrimidinethiol; 4-(N-n-hexyl-furfurylamino)-2-chloropyrimidine; 4-tetrahydrofurfurylaminopyrimidine.

The above physiologically active pyrimidines of this invention can be prepared in like manner to those illustrated in the foregoing examples. For instance, the compounds listed immediately above can be prepared directly by the condensation between, respectively, 6-amino-2,4-dimercaptopyrimidine (i. e., 6-amino-2,4-pyrimidinedithiol) and N-methyl-4(2-furyl)butylamine; 2-amino-4-mercaptopyrimidine (i. e., 2-amino-4-pyrimidinethiol) and 2-pyrrolylmethylamine; 2-hydroxy-4-mercaptopyrimidine (i. e., 2-hydroxy-4-pyrimidinethiol) and 3(2-thienyl)-2-butylamine; acetonitrile trimer (i. e., 4-amino-2,6-dimethylpyrimidine) and 2-tetrahydrofurfurylchloride; dithiouracil (i. e., 2,4-pyrimidinedithiol) and 4-thiazolylmethylamine; 2,4-dichloropyrimidine and N-n-hexyl)-furfurylamine; and 4-chloropyrimidine and tetrahydrofurfurylamine.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A compound represented by the formula

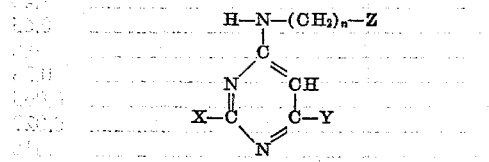

wherein X is a member of the group consisting of hydrogen, hydroxyl, amino, chloro, bromo, thiol and methyl radicals, Y is a member of the group consisting of hydrogen, methyl and amino radicals, Z is a heterocyclic 5-membered ring containing at least 3 carbon atoms and up to 2 hetero atoms selected from the class consisting of oxygen, sulfur and nitrogen, and $n$ is an integer of from 1 to 6.

2. 4-furfurylamino-2-mercaptopyrimidine.
3. 4-thenylamino-2-mercaptopyrimidine.
4. Process for the regulation of plant growth which comprises applying to living botanical material a compound according to claim 1.

References Cited in the file of this patent

Russell et al.: J. Am. Chem. Soc. 71, 2279-2282 (1949).

UNITED STATES PATENT OFFICE
CERTIFICATE OF CORRECTION

Patent No. 2,844,578                                        July 22, 1958

Donald S. Acker

It is hereby certified that error appears in the printed specification of the above numbered patent requiring correction and that the said Letters Patent should read as corrected below.

Column 1, line 37, for "nucleus to which" read ---nucleus which---; column 4, line 64, strike out "at least", both occurrences.

Signed and sealed this 14th day of October 1958.

(SEAL)
Attest:
KARL H. AXLINE

Attesting Officer

ROBERT C. WATSON
Commissioner of Patents